United States Patent [19]

Tolman

[11] Patent Number: 5,339,621
[45] Date of Patent: Aug. 23, 1994

[54] WASTE TREATMENT SYSTEM AND METHOD UTILIZING PRESSURIZED FLUID

[75] Inventor: Radon Tolman, Santa Fe, N. Mex.

[73] Assignee: Environmental Energy Systems, Inc., Santa Fe, N. Mex.

[21] Appl. No.: 125,649

[22] Filed: Sep. 22, 1993

Related U.S. Application Data

[62] Division of Ser. No. 939,480, Aug. 31, 1992, Pat. No. 5,280,701.

[51] Int. Cl.$^5$ .......................... F02G 3/00; F23G 5/12
[52] U.S. Cl. ..................... 60/39.02; 60/39.12; 210/769; 110/229; 122/379
[58] Field of Search .............. 60/39.02, 39.05, 39.12, 60/39.464; 210/180, 181, 713, 714, 761, 769, 774; 431/4, 11, 207, 215; 110/229; 122/379

[56] References Cited

U.S. PATENT DOCUMENTS

| | | | |
|---|---|---|---|
| 3,807,564 | 4/1974 | Hess et al. | 210/177 |
| 3,847,713 | 11/1974 | Akune et al. | 159/47.7 |
| 4,113,446 | 9/1978 | Modell et al. | 48/202 |
| 4,133,273 | 1/1979 | Glennon | 110/346 |
| 4,171,265 | 10/1979 | Battigelli et al. | 210/56 |
| 4,229,296 | 10/1980 | Wheaton et al. | 210/758 |
| 4,338,199 | 7/1982 | Modell | 210/721 |
| 4,473,459 | 9/1984 | Bose et al. | 110/229 |
| 4,507,127 | 3/1985 | Hirose | 110/229 |
| 4,543,190 | 9/1985 | Modell | 210/721 |
| 4,564,458 | 1/1986 | Burleson | 210/747 |
| 4,568,271 | 2/1986 | Mallek | 110/229 |
| 4,572,797 | 2/1986 | Silver | 252/631 |
| 4,597,771 | 7/1986 | Cheng | 48/77 |
| 4,886,000 | 12/1989 | Holter et al. | 110/345 |
| 5,050,374 | 9/1991 | Hunter | 60/39.02 |
| 5,067,317 | 11/1991 | Kasper | 60/39.464 |
| 5,072,675 | 12/1991 | Fowler | 110/229 |
| 5,107,874 | 4/1992 | Flanigan et al. | 210/181 |
| 5,191,845 | 3/1993 | Spliethoff | 110/229 |
| 5,280,701 | 1/1994 | Tolman | 60/39.02 |

FOREIGN PATENT DOCUMENTS

| | | | |
|---|---|---|---|
| 0484042 | 5/1992 | European Pat. Off. | 122/379 |
| 1067166 | 10/1959 | Fed. Rep. of Germany | 60/39.464 |
| 53-32202 | 3/1978 | Japan | 122/379 |
| 0362782 | 8/1962 | Switzerland | 60/39.464 |
| 1746120 | 7/1992 | U.S.S.R. | 122/379 |

Primary Examiner—Richard A. Bertsch
Assistant Examiner—Howard R. Richman
Attorney, Agent, or Firm—Workman, Nydegger & Jensen

[57] ABSTRACT

The invention comprises an apparatus and method for high pressure treatment of wastes without the addition of excess oxygen and without interference by corrosive deposits. Waste materials are suspended or dissolved in a processing fluid. The pressure of the fluid is raised to a pressure in the range of from about 70 psig to about 5,000 psig. A boiler is then used to heat the high pressure fluid to temperatures above the critical temperature. Solids within the boiler participate in fluidized bed particle scrubbing technology in order to minimize the fouling and corrosion occurring within the boilers during heating. From at least a portion of the vapors produced by the heating in the boiler, net energy output is produced. Useful byproducts can be produced from the vapors.

32 Claims, 5 Drawing Sheets

WASTE TREATMENT SYSTEM AND METHOD UTILIZING PRESSURIZED FLUID

This application is a divisional application of application Ser. No. 07/939,480, filed Aug. 31, 1992, now U.S. Pat. No. 5,280,701.

BACKGROUND

1. Field of the Invention

The present invention relates to a waste treatment system wherein fluidized bed particle scrubbing technology is used for high pressure treatment of wastes. More particularly, the present invention relates to high pressure treatment of wastes without the addition of excess oxygen and without interference by corrosive deposits.

2. Background of the Invention

The oxidation of organic materials to carbon dioxide and water is a combustion process often used to dispose of waste materials in boilers and incinerators to generate useful energy for heating and power generation. In the conventional generation of steam, organic materials are oxidized rapidly in combustion to produce heat that is transferred through a heat transfer surface to pressurized water. Twenty percent of the heating value of the fuel may be lost in the exhaust stack of conventional steam boilers. Over fifty percent of the ability of the fuel to perform useful work, such as for electric power generation, is lost in conventional low pressure steam boilers. The ability of the fuel to perform useful work is referred to as availability or exergy. Exergy has the formula $e_x = h_1 - h_2 - T_0(s_1 - s_2)$, wherein $h_1$ and $h_2$ are the enthalpy of a stream entering and leaving a control surface respectively, $s_1$ and $s_2$ are the corresponding entropies, and $T_0$ is the absolute ambient temperature. Exergy is an analytical tool for optimizing energy.

Exergy analysis indicates that exergy loss is proportional to the heat transferred and the temperature difference across the heat transfer surface. Exergy loss is also caused by excess air and water in the fuel that must be evaporated during combustion at atmospheric pressure.

Heat transfer through surfaces of conventional steam boilers causes loss of availability and often requires the use of specialized materials for exposure to high flame temperatures. On the flame or hot gas side of the tubes, ash or other deposits often impede heat flow and reduce heat transfer. Hot spots due to deposition on boiler tubes can cause expensive downtime due to rupture of the tube wall. Heat recovery boilers designed for refuse incinerators are typically lower in electrical output in waste-to-energy cogeneration systems for production of heat and power.

Combustion processes are characterized by emission of inorganic materials in the flue gases as fine particulate, fly ash, and acid gas pollutants, such as $SO_2$, HCl, $CO_2$ and nitrous oxides (NOX). These "greenhouse gases" can contribute to global warming and acid rain. Acid gases can be removed from flue gases using modern pollution controls, such as dry scrubbing, selective catalytic reduction (SCR), and Benfield processes, known in the art today. Capital costs are high because the acid gases are diluted by other products of combustion, including nitrogen and water vapor.

Products of incomplete combustion (PICS), such as CO and hydrocarbons, dioxins, and furans, require a combination of excess oxygen, time, temperature, and turbulence to minimize air quality impacts. Two-stage combustion has been used to help control emissions of NOX and PICS, such as controlled-air incinerators. A quantity of air below that required for complete combustion is used to pyrolyze the fuel to produce combustible gases that are subsequently burned with excess secondary air. This method, however, still does not assure compliance with air quality control regulations.

Fluidized bed combustion has been developed to reduce acid gas emissions through the use of absorbents such as limestone within the bed. Another benefit of fluidized bed combustion is enhanced heat transfer to external boiler tube surfaces caused by impingement of solids, where erosion of the tube surface can be minimized by proper design. However, with the fluidized bed combustion used in the prior art, the inside surfaces of the boiler tubes are not protected from fouling and corrosion. Only the outer surfaces are protected.

Additionally, in conventional boilers, boiler feedwater is filtered and cleaned to extremely low levels of contaminants to avoid deposition and corrosion of internal surfaces of the boiler tubes.

More stringent regulations have tightened limits on pollutants in the flue gas and water pollutants carried out of the boiler feedwater treatment system or in the blowdown that is used to remove contaminants from a boiler. Ash that is produced from the combustion or gasification of dirty fuels is conventionally separated into fly ash and bottom ash that can require separate testing and disposal using expensive ash treatment and/or expensive specialized lined and monitored landfills.

A gas turbine for burning clean fuels can be combined with a heat recovery boiler and steam turbine in a combined cycle system. Pressurized combustion and lower temperature differences across heat transfer surfaces help to minimize exergy losses and fireside boiler problems. A gas turbine is used to drive a generator and a compressor that supplies air to the combustion chamber. Air is typically supplied at over twice the stoichiometric flow rate necessary for complete combustion of the fuel to control turbine inlet temperature. Compression of this excess air leads to exergy loss.

Capacity of the system is limited by compressor inlet pressure at altitude. For example, a typical gas turbine compressor produces about 25% less flow and about 25% less pressure at 7,000 ft elevation than at sea level. The turbine produces more useful work when operated at a turbine inlet temperature above about 2,000° F., but this tends to produce NOX. Steam or water injection is sometimes used to control NOX formation to below about 50 parts per million by volume (ppmv). Steam injection above that required for NOX control has been found to increase efficiency and the output of useful work from a gas turbine if fuel is added to achieve the same turbine inlet temperature such as in the dual fluid cycle.

Corrosion, erosion, and deposition are problems in steam turbines that are conventionally used to produce useful work from untreated water by isentropic expansion, such as in geothermal energy recovery. Turbine inefficiencies and non-ideal gas behavior in isentropic expansion generally cause a loss of useful work in these systems. Gas turbines have the same problems when using dirty fuels at high temperatures that may contain chlorine, sulfur, and alkali metals. Modern materials such as superalloys and resistant coatings have helped to solve these problems in petrochemical and oil refining applications at temperatures up to about 760° C. (1,400° F.), such as in fluid cat cracker power recovery.

In one known process for treating waste organic materials, i.e. the wet air oxidation process described in U.S. Pat. No. 4,229,296, an organic feed and oxidizing agent are pressurized to reaction condition of from about 800 to 2,200 psig, heated to operating temperature and fed to a reactor for residence times of 30 min. to 1 hour. This process is known to be effective for removing 70–95% of the initial organic material. This system is effective for organic waste treatment but has certain disadvantages. Air compression consumes exergy and increases equipment usage. Often the solubility of oxygen or air in water is below the level required for complete oxidation of the organic materials. Thus, a two-phase water-gas mixture is often used in staged reactors, necessitating provisions for agitation in the reactor to avoid excessive mass transfer resistance between the phases. Often volatile organics such as acetic acid remain after complete processing. The energy available for recovery in the effluent requires separation of liquids and gasses. This technology is a net consumer of energy, as determined by Stone & Stone Webster in DOE/ID-127111-1 (September 1989).

It has long been known that an increase in the speed and efficiency of oxidation of organic substances can be induced by subjecting the substances and oxygen to greatly increased pressure and temperature conditions. Hydraulic columns have been used to create the desired pressure conditions, as described in U.S. Pat. Nos. 4,594,164 and 4,564,458, up to, and including, the supercritical conditions of water. The critical point is the point of temperature and pressure at which the phase barrier between water and vapor no longer exists. This condition begins to occur at a pressure of 3207 psi and 706° F. Gasses, such as oxygen are fully miscible in all proportions and most inorganic salts are virtually insoluble. Under these conditions, water becomes an excellent solvent for organic substances. These organic columns can reach this pressure easily at depth but additionally heat must be generated and/or added at the location of critical pressure to simultaneously reach critical temperature.

It is taught in U.S. Pat. No. 4,594,164 that the required heat for starting to treat waste within the hydraulic column can be added by burning a supplementary fuel such as propane with oxygen that is compressed for introduction to the critical zone of the column or by preheating all of the fluids in the reactor. Thereafter the reaction can be self-sustaining by transferring the heat of oxidation of organic material to the waste feed stream. In U.S. Pat. No. 4,564,458, it is taught that the required heat can be generated by resistive heating using direct current electrical energy. Unfortunately, this wastes exergy.

Gasses can come out of solution as the effluent rises within the hydraulic column, causing two-phase flow that can induce "geysering" and surges that are difficult to control The inorganic salts that become insoluble at supercritical conditions in hydraulic columns can dissolve as the effluent rises and pressure is reduced. This stream may require subsequent treatment to remove these salts for recovery of clean water or disposal in accordance with the Clean Water Act. Carbonates can cause scaling problems that inhibit heat transfer and require nitric acid wash for removal.

Hydraulic columns reduce the energy required for pumping the waste by lowering injection pressure to the pressure required to overcome pressure drop in the apparatus and to provide pressurized effluent. Heat is usually transferred from the effluent stream to the incoming waste stream, producing a low temperature effluent stream. The energy available for recovery is generally very small in the effluent from hydraulic column treatment of wastes, thus making this method a net consumer of energy.

Supercritical conditions can be achieved in above-ground apparatus, as proposed in U.S. Pat. Nos. 4,338,199 and 4,453,190. A key feature is that a single fluid phase reaction occurs in the oxidizer at supercritical conditions of the reaction mixture and preferably at the near critical condition of water. Excess oxygen is added to drive the oxidation reactions to completion quickly, thus providing shorter residence time. However, excess oxygen requires the use of specialized materials to avoid excessive corrosion of reactor surfaces.

Several groups have been investigating destruction of hazardous wastes in supercritical water. Because of the high solubility of organics and the low solubility of inorganics in supercritical water, hazardous wastes can be treated and inorganic contaminants removed upon treatment with supercritical water. Most applications have relied upon introducing oxygen to the supercritical reactor to oxidize the organics and to provide the heat required to reach supercritical conditions (374° C., 221 bar). However, several problems have developed from the use of excess oxygen in the system. For example, the excess oxygen causes severe corrosion and requires high energy costs for compression. Additionally, the inorganics are removed as a brine slurry that requires supplemental treatment for discharge. Further, the processing of wastes in supercritical water results in problems of corrosive deposits on the reactor walls.

High pressure boilers, such as are conventionally used in the supercritical steam cycle, produce vapor at about 3,500 psig and 1,000° F. that can produce more useful work. However, saturation is reached by one turbine-generator stage, requiring reheat in the combustion zone of the boiler for additional production of useful work. A conventional supercritical steam plant may have two reheat stages and has a thermal efficiency (to electric power) of about forty percent.

In U.S. Pat. No. 4,543,190, the mixture is reacted in a single fluid phase in a well-insulated reactor to cause the organic material to be oxidized whereby the effluent stream is heated by the oxidation reactions. The heated effluent can be used to provide heat to the reaction mixture through a heat exchange wall surface. Direct mixing is preferred since it enables reaching 706° F. or higher rapidly, i.e., substantially instantaneously, thus avoiding char-forming polymerization that can interfere with heat transfer to the incoming waste stream or incoming oxygen/water mixture.

When acid anions are formed by oxidation of waste materials, the anions can be reacted with appropriate cations, such as sodium, potassium, magnesium, iron or calcium ions, and the resulting inorganic salts are precipitated under reaction conditions. The cations can be provided from their carbonates, hydroxides or oxides. However, carbonate formation interferes with the anion/cation reactions. For this reason, NaOH has been used to react with HCL produced by supercritical water oxidation of chlorinated hydrocarbons to produce NaCl for removal.

The oxidizer can be designed as in U.S. Pat. No. 4,822,497 to allow solids and inorganics that precipitate to be separated into a cooling zone for temperature reduction below critical temperature, thus causing the precipitate to dissolve and be readily removed in a brine or slurry for blowdown. However, this stream may require subsequent treatment to remove these slats and solids for production of clean water or disposal in accordance with the Clean Water Act.

Net energy output is restricted by the power requirement of the oxidant compressor that delivers excess oxygen at over 3,207 psia to fully oxidize the organic material and to minimize carbon monoxide in the effluent. The net energy output is further restricted by high power input to the feed pump that delivers sufficient overpressure to power the recycle pump. These processes are net consumers of energy, as determined by Stone & Webster in DOE/ID-12711-1 (September 1989).

It has been suggested that toxic organic materials can be gasified or reformed at the supercritical conditions of water to harmless lower molecular weight materials by breakdown of organic chains and the like whereby the resulting non-toxic materials can be disposed. U.S. Pat. No. 4,113,446 proposes that solid and liquid organic materials can be converted to high BTU gas with little or no undesirable char formation by reaction with water at or above its critical conditions, including the addition of catalysts. However, the conversion to char or coke is undesirably increased as the reaction temperature approaches the critical temperature of water for certain liquid and solid organic materials, regardless of pressure. This char or coke interferes with the heat transfer required to raise the reaction mixture to supercritical conditions.

U.S. Pat. No. 4,113,446 claims an unexpected conversion to high BTU gas occurs above the critical temperature and pressure of water, and that endothermic steam-carbon and exothermic methanation reactions occur concomitantly, so that "very little" heat need be added to the process from external sources. However, the experimental data in U.S. Pat. No. 4,113,446 does not support this claim. Examples in support of this are herein presented.

Two examples are provided which illustrate that addition of "very little" heat as disclosed in Modell is not supported. In a computer simulation, methane and water gas shift equilibrium was assumed. What was found was that significant heat is predicted for devolatilization of organics and heating the water that is not provided by heat of formation of methane. The endothermic heat for devolatilization adds to the heat required to bring water to supercritical conditions. The results of the computer simulation showing that Modell has no support follow.

In the examples, each number represents a particular stream within the simulated waste treatment cycle. The simulated cycle is illustrated in FIG. 1.

| STREAM | MASS FLOW-RATE, LB MOL/HR | BHP | PRES-SURE, PSIA | TEMP., F. |
|---|---|---|---|---|
| 1 | 10,000 | | 15 | 65.5 |
| 2 | 10,000 | | 3,500 | 65.5 |
| 3 | 9,800 | | 3,450 | 1,025 |
| 4 | 9,800 | | 190 | 378 |
| 5 | 9,530 | | 190 | 370 |
| 6 | 1,096 | | 190 | 60 |
| 7 | 30,958 | | 11.1 | 60 |
| 8 | 41,610 | | 189 | 1,850 |
| 9 | 41,618 | | 11.6 | 857 |
| 10 | 41,830 | | 11.4 | 1,075 |

-continued

| STREAM | MASS FLOW-RATE, LB MOL/HR | BHP | PRES-SURE, PSIA | TEMP., F. |
|---|---|---|---|---|
| 11 | 41,830 | | 11.1 | 300 |
| 12 | | −57,232 (NET) | | |
| 13 | | −1,075 | | |
| 14 | | 139,270 | | |
| NET POWER OUTPUT | | 80,980 | | |
| EFFICIENCY | | 39.4% (TO ELECTRIC POWER) | | |

| STREAM | MASS FLOW-RATE, LB MOL/HR(LB/HR) | BHP | PRES-SURE, PSIA | TEMP., F. |
|---|---|---|---|---|
| 1 | (218,000)* 15 | | 63.4 | |
| 2 | (218,000)* 3,500 | | 63.4 | |
| 3 | 10,900 | | 3,450 | 1,150 |
| 4 | 10,900 | | 130 | 386 |
| 5 | 10,900 | | 130 | 386 |
| 6 | 0 | | | |
| 7 | 31,190 | | 11.1 | 60 |
| 8 | 41,750 | | 129 | 1,890 |
| 9 | 41,750 | | 11.6 | 995 |
| 10 | 41,970 | | 11.4 | 1,220 |
| 11 | 41,970 | | 11.1 | 300 |
| 12 | | −34,960 (NET) | | |
| 13 | | −1,072 | | |
| 14 | | 128,346 | | |
| NET POWER OUTPUT | | 92,205 | | |
| EFFICIENCY | | 43.6% (TO ELECTRIC POWER) | | |

*This flowrate includes 180,000 lb/hr of water and 38,000 lb/hr of waste "coal," having the following composition:
Carbon 66.7%
Oxygen 7.6%
Hydrogen 4.6%
Sulfur 0.5%

BRIEF SUMMARY AND OBJECTS OF THE INVENTION

It is an object of the present invention to provide methods and apparatus for treating organic materials to obtain useful energy and useful materials.

It is another object of the present invention to provide a method and apparatus which enables treatment in a high pressure fluid, at least a portion of which is water.

It is another object of the present invention to provide methods and apparatus for rendering harmless and easily disposable, waste and toxic materials where the energy of oxidation thereof can be harnessed to carry out the processing and to produce useful work.

It is a further object of the present invention to provide methods and apparatus in accordance with the preceding objects to minimize the energy required to supply air and oxygen and organic materials to the process.

An additional object of the present invention is to provide methods and apparatus that enable the production of clean high quality liquids and gasses than can be used for fuel within the process and for removal and beneficial use.

Yet another object of the present invention is to provide methods and apparatus for the separation of solid inorganic materials from liquid and gaseous organic materials and subsequent treatment for preferred beneficial use or environmentally benign disposal.

A further object of the present invention is to provide methods and apparatus for using solids that may be recirculated within the process or added with the feed to minimize fouling and to enhance heat transfer.

Another object of the present invention is to provide methods and apparatus for forming activated carbon within the process for cleaning liquids and gasses within the process, for use as fuel within the process, or for beneficial use external to the process.

It is another object of the present invention to provide methods and apparatus for safe operation and to minimize the effluence of pollutants.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, methods and apparatus are provided for treatment of waste materials. Organic materials that may contain inorganic materials are treated in a high-pressure fluid to produce useful liquid and gaseous organic materials and solid inorganic materials that can be separated easily by conventional means. The useful organic materials can be further separated into useful byproducts and liquid or gaseous fuels for use within the process to produce heat for processing and useful work. The inorganic materials that may contain residual organic materials are removed for use as a byproduct or as fuel within the system. Separated solids may be used to seed agglomerate inorganics. Those surfaces form a base on which the inorganics can be deposited and separated out. Solids are also used within the heating area in a fluidized bed particle scrubbing process to prevent corrosion and fouling from occurring on the walls of the heating area.

With the present invention the waste materials to be treated can be suspended or dissolved in the processing fluid in dilute or concentrated form for feed to the process by pumping the materials to a pressure in the range of from about 70 psig to about 5,000 psig without the need for adding excess oxygen. The treatment and production of heat and useful work are facilitated by raising the temperature of the fluid to the temperature at which at least a portion of the organic material and at least a portion of the processing fluid are vaporized. The vapor is separated from the remaining liquid and any solids that may be produced. The remaining liquid and any solids are withdrawn, and the vapor is used for energy production and/or for the production of useful by-products.

The present invention provides an apparatus and method for oxidizing wastes wherein the method comprises the steps of forming a mixture of organic material and feed slurry; increasing the pressure of the mixture; heating the mixture by flowing the mixture through a heat exchanger such that the water and at least a portion of the fuel are vaporized, thereby leaving solids and vapor; recirculation of the solids and use of the solids for fluidized bed particle scrubbing; separating the solids from the vapor and cooling the solids; reducing the pressure of the solids for disposal; expanding the vapor for the production of useful work whereby the pressure and temperature of the vapor are lowered; cleaning the vapor by introducing the vapor to a separator wherein the vapor is cleaned of residual solids and useful byproducts are withdrawn; introducing the cleaned vapor to a combustor wherein it is burned with air to form a hot flue gas; expanding the hot flue gas for the production of work; conducting the flue gas back to the heat exchanger to heat the mixture of organic material and feed slurry flowing therethrough; and conducting the flue gas to a receiver for possible discharge into the atmosphere.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

The present invention relates to high pressure treatment of wastes to control corrosive deposits and enhance heat transfer, without the addition of excess high pressure oxygen.

Figure 1:
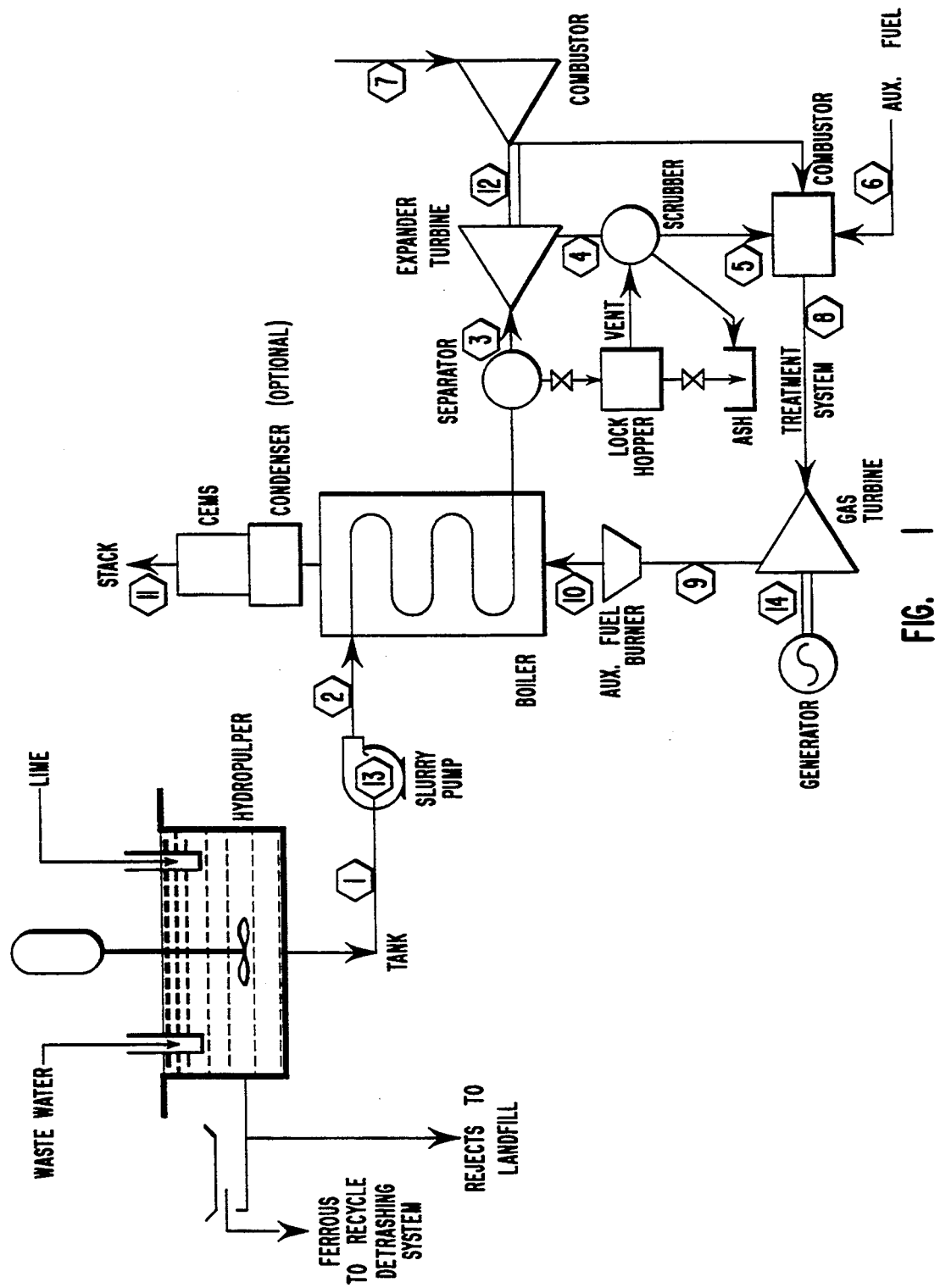
FIG. 1 illustrates a computer simulated schematic diagram corresponding to the Examples 1 and 2.
Figure 2:
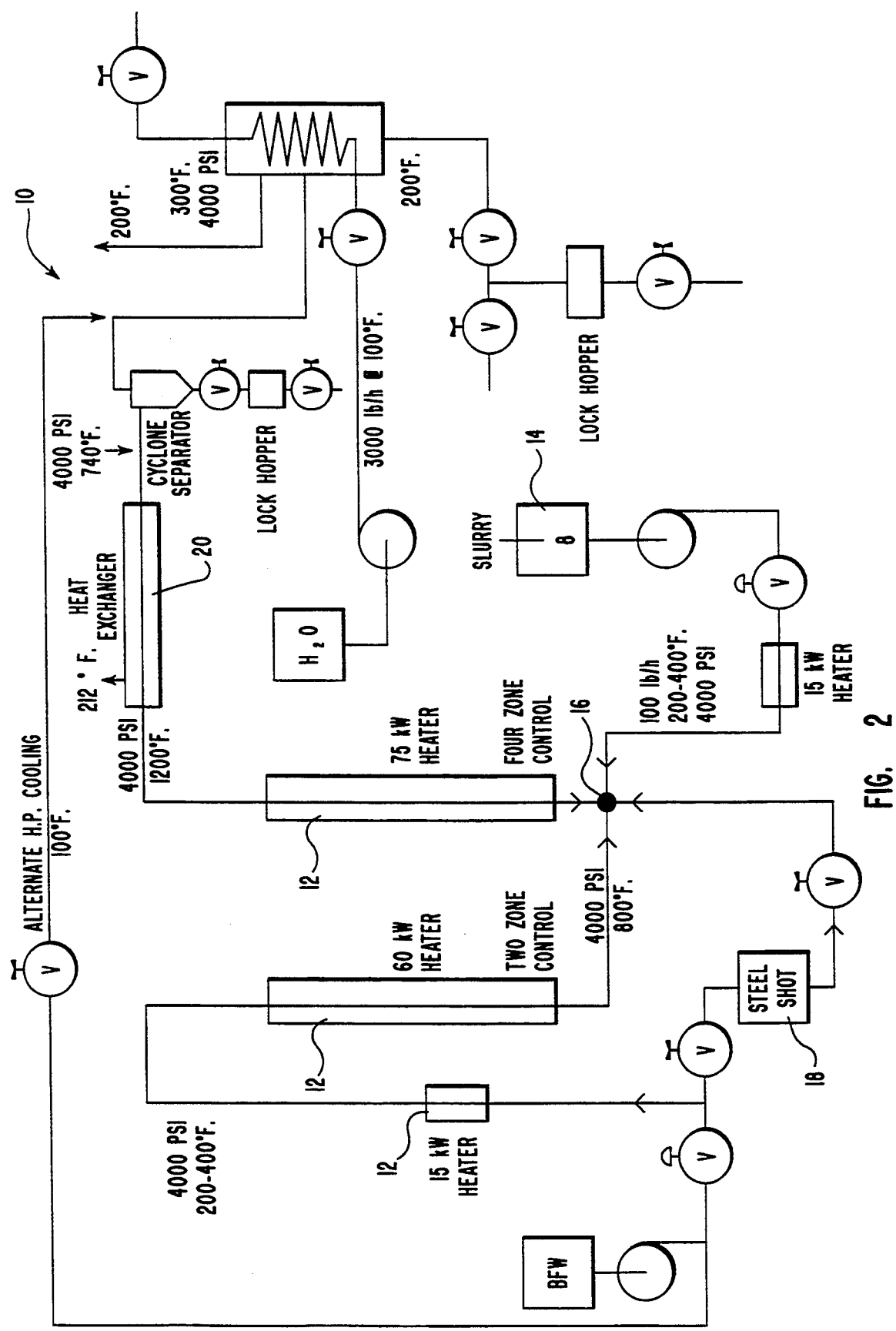
FIG. 2 illustrates a schematic diagram of an apparatus within the scope of the present invention which is useful for supercritical water treatment.

With reference to FIG. 2, an embodiment for the treatment of wastes by treatment in a fluid containing supercritical water can be seen and is generally labelled 10. The process used in the diagram is designed to allow heating of clean, 4,000-psi boiler-quality water to 800° F. using electric radiant heaters 12 as pictured in FIG. 2.

The 4,000 psi water is first mixed with a smaller stream of contaminant slurry 14. Mixture occurs in an unheated area at a mixer 16. Once the water and slurry is mixed, the combined stream will be slightly above the critical temperature (704° F.).

A solid (steel shot) injection system 18 introduces approximately 1/16 inch steel shot to the bottom of the reactor 20 to scrub the walls of the reactor tube and minimize corrosion and fouling of the reactor tube caused by heating the mixture to the supercritical temperature. The design of the system is such that, in effect, the steel shot turns the reactor tube into a fluidized bed reactor with continuous scrubbing of the inner heat-transfer surface. At the reactor tube outlet, maximum velocity is 16 ft/s. The steel shot size will be varied to alter the height of the fluidized bed scrubbing action.

Figure 3:
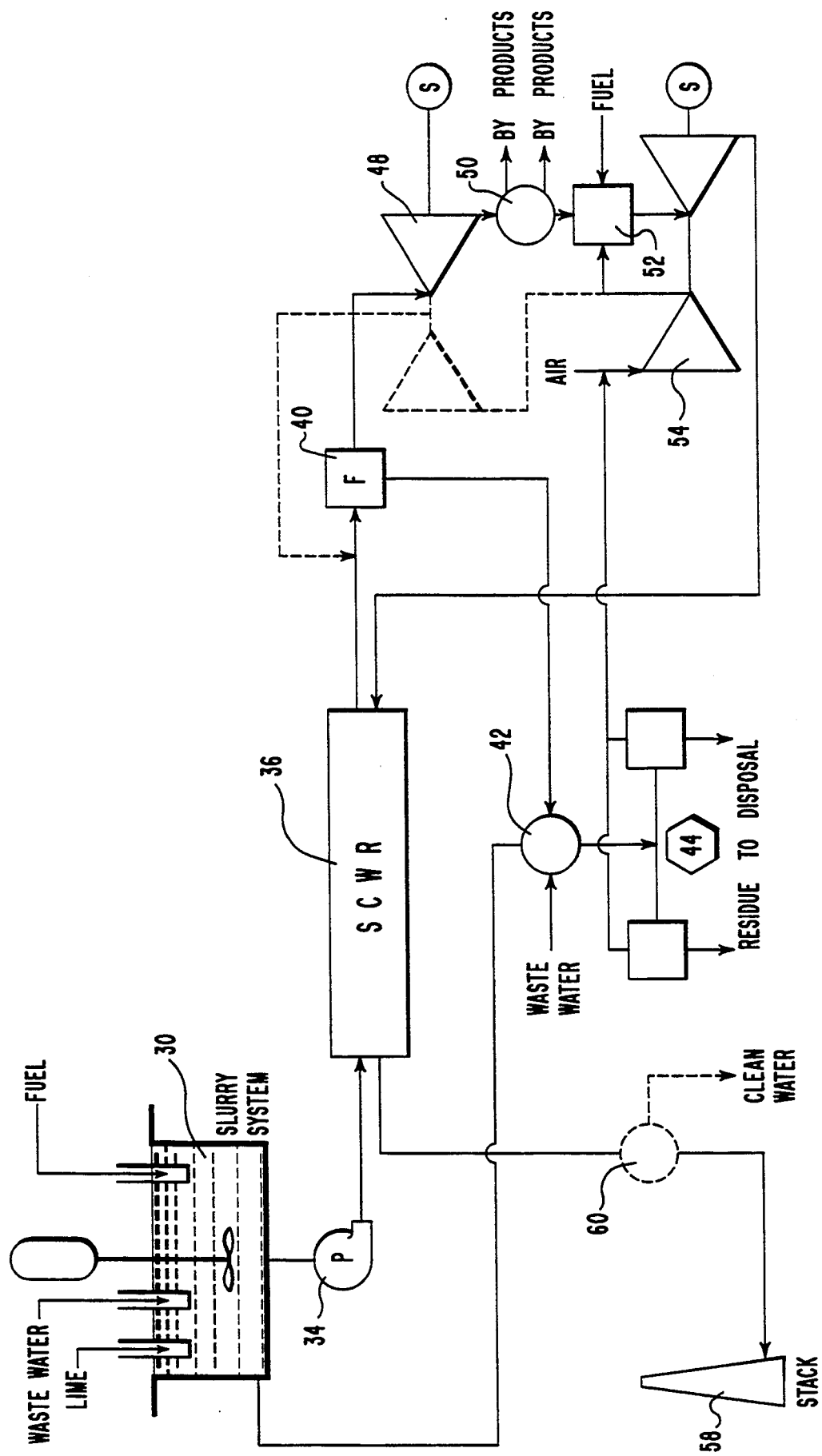
FIG. 3 illustrates a schematic diagram of a preferred embodiment of the present invention.

FIG. 3 illustrates a preferred embodiment for the production of useful work and useful byproducts from organic materials that contain or produce solid inorganic materials when treated in a fluid containing supercritical water, which may utilize the system illustrated in FIG. 2.

As seen in FIG. 3, the organic material is conducted to a slurry tank 30 wherein it is mixed with wastewater, lime and sufficient fuel such as lignite coal and/or refuse derived fuel to maintain the allowable inlet temperature of a gas turbine generator 32. The mixture is conducted to a slurry pump 34 wherein pressure is increased to above 3,207 psia. The high pressure slurry is then conducted to a heat exchanger 36 wherein the water and at least a portion of the organic material and at least a portion of the fuel are heated so as to become vaporized. It is preferred that the temperature be about 1200° F. within the heat exchanger 36.

From heat exchanger 36, the vapor and solids are then conducted to a first separator 40 wherein the solids are separated from the vapor. First separator 40 may be one of many types of separators. For example, within the scope of the present invention, first separator 40 may be a gravity settling separator or a screen-type filter. However, the presently preferred separator is a centrifugal separator because it is continually operable. Frequent changes and replacement of a centrifugal separator is not necessary.

Once the solids are separated out of the stream, the solids are conducted to a cooler 42. At cooler 42, preferably a heat exchanger, the solids are cooled by wastewater added into the system. The solids are then introduced to a lockhopper 44 wherein pressure is reduced for disposal or waste treatment, and any dissolved gasses and condensed liquids are vented to the process.

As stated earlier, solids are separated from the vapor at first separator 40. This vapor which was separated from the solids is conducted to a first turbine 48 wherein it is isentropically expanded for the production of useful work. Here, the pressure and temperature are lowered. The pressure is lowered to about 150 psi.

From first turbine 48, the vapor is then introduced to a second separator 50, wherein the vapor is cleaned of residual solids, and useful byproducts such as oil and/or ammonia are withdrawn. It must be noted that this cleaning of the vapor and separation of useful byproducts can also be facilitated by the optional introduction of cooling water.

The clean vapor is then introduced to a combustor 52 where the vapor is burned with air. Combustor 52 is preferably a catalytic combustor, and combustion occurs with fuel added to combustor 52. It is also within the scope of the present invention that combustor 52 be a fluidized bed combustor, or a pressurized fluidized bed combustor.

The hot flue gas is then conducted from combuster 52 to a second turbine 32, preferably a gas turbine generator, wherein the hot flue gas is isentropically expanded for the production of additional useful work to drive a generator and an air compressor 54. Air compressor 54 provides air to the combustor 52.

The expanded flue gas is then conducted back to heat exchanger 36 where it is flowed in the direction opposite from the flow of the initial mixture of organic material and feed slurry. As the expanded flue gas flows through the heat exchanger 36, the expanded flue gas exchanges heat with the feed slurry mixture such that the feed slurry mixture is heated and the flue gas is cooled in an efficient manner. From heat exchanger 36, the flue gas moves to a stack 58 where it can be released into the atmosphere.

It is important to note that an optional condenser and separator 60 can be used to separate and remove a clean water stream from the flue gas for use as a byproduct.

Figure 4:
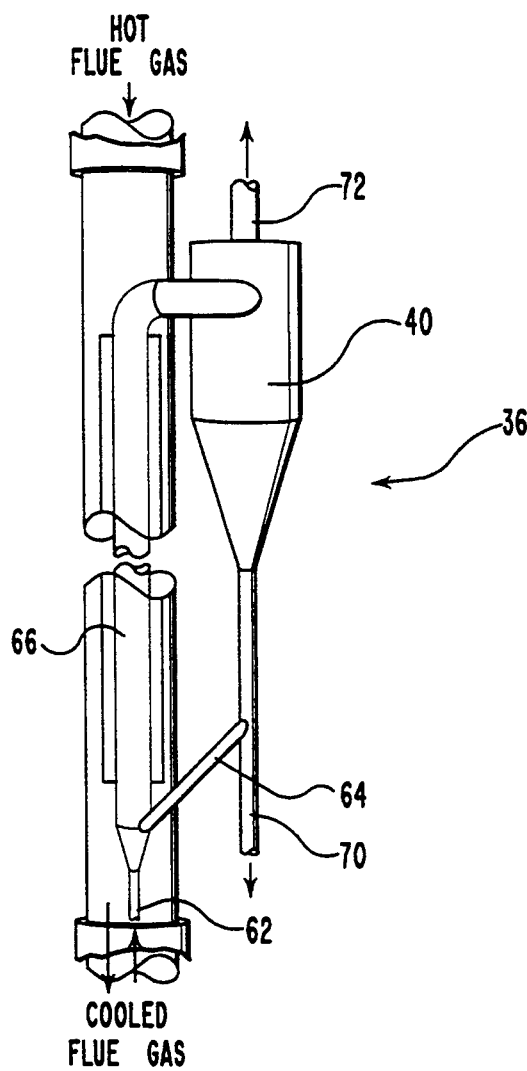
FIG. 4 illustrates a schematic diagram of a supercritical turbulent flow reactor apparatus for treating organic tar and char producing materials that can foul heat transfer surfaces.

FIG. 4 illustrates in more detail the heat exchanger 36 of FIG. 3. The heat exchanger 36 comprises a supercritical turbulent flow reactor. This turbulent flow reactor is used for treating organic materials that produce tar and char during heating. In the conventional heat exchangers, this tar and char can foul the heat transfer and is thus undesirable.

As can be seen in FIG. 4, feed slurry is introduced in a stream 62 and mixed with hot recycle solids from a stream 64. This mixture quickly raises the temperature through the pyrolysis range. The temperature is raised to about 1200° F. Once the feed slurry and hot recycle solids are mixed, they are flowed to a turbulent riser 66 within the reactor. In turbulent riser 66, turbulent flow of the feed slurry and recycle solids mixture occurs. With this turbulent flow, the fluidized bed particle scrubbing occurs. This turbulent flow velocity is maintained by the decrease in density during heating in the near-critical region shown in FIG. 5. At the outlet of the reactor, the turbulent flow velocity is around 16 feet/second.

An advantage of the turbulent flow is that it enhances heat transfer and provides nucleation for agglomeration of tar and precipitated salts. Without the solids, the tar and precipitated salts would deposit solely upon the walls of the turbulent flow reactor. With the solids in the turbulent flow reactor of the present invention however, an alternate surface for the tar and precipitated salts to deposit is provided. Thus, fouling and corrosion of the reactor is minimized.

From the turbulent riser 66, the feed slurry and solids mixture is conducted into the first separator 40, wherein solids are separated from the mixture. These separated solids can be used for recycle via stream 64 back into the turbulent riser, and/or withdrawn via a stream 70 to the blowdown cooler 42. As stated in relation to the embodiment of FIG. 3, the solids are cooled at cooler 42 by added wastewater. The solids are then introduced to lockhopper 44 wherein pressure is reduced for disposal or waste treatment. At lockhopper 44, the letdown of pressurized solids occurs to assist in eliminating corrosion. What occurs here is that the solids are accumulated at pressure. Any gases contained therein are bled off to lower the pressure. When a discharge pressure is reached, the solids can be dropped out.

After the solids are separated from the vapor at first separator 40, the cleaned vapor travels in a stream 72 from first separator 40 to the first turbine generator 48. Before the cleaned vapor is introduced to the first turbine generator 48, the cleaned vapor has been first superheated to a temperature of from about 706° F. to about 1,200° F. From first turbine generator 48, the vapor follows the path as described in relation to the embodiment of FIG. 3.

Figure 6:
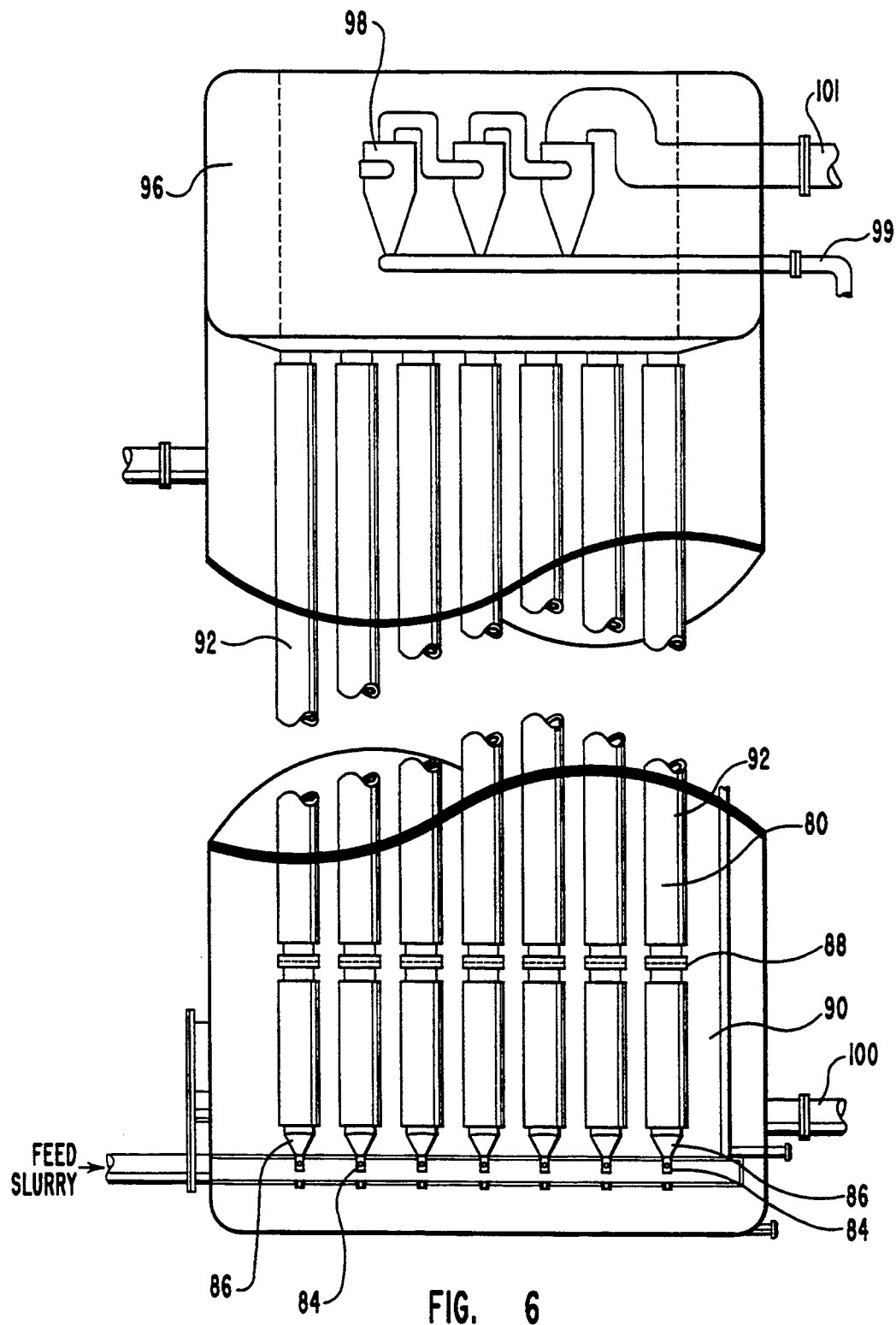
FIG. 6 illustrates a schematic diagram of a heat recovery boiler design.

In an alternate embodiment, the features of the supercritical turbulent flow reactor apparatus can be incorporated in a multiple tube arrangement as shown in FIG. 6.

Figure 5:
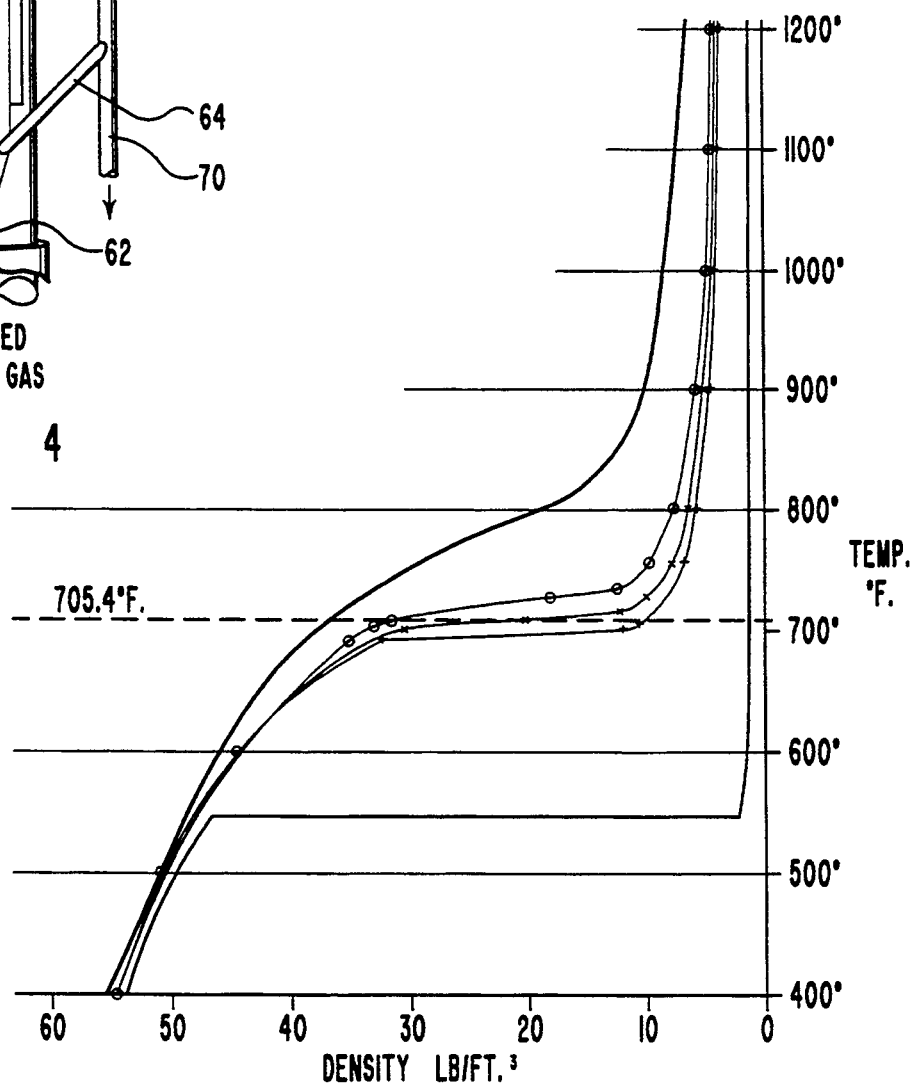
FIG. 5 is a graph of the density of water at various temperatures and pressures than can be used in the invention.

FIG. 5 illustrates a graph of the density of water at various temperatures and pressures that can be used in the invention. In the graph, the solid line indicates 1,000 psia (expansion ratio approximately 52). The "plus"

symbols indicate 3,000 psia. The "x" symbols indicate 3,206.2 psia (expansion ratio approximately 13.5). The circle with dot inside indicates 3,500 psia. The dashed line indicates 5,000 psia (expansion ratio approximately 10).

With reference now to FIG. 6, a recovery boiler design is pictured. A vertical shell and tube configuration is composed of one or more vertical tubes 80 of a minimum of about 1 inch inside diameter, designed in accordance with the ASME code. The preferred material of the tubes is the Incoloy 800 series as produced by International Nickel. The material has the characteristics of being a superalloy with good high temperature creep-rupture properties. Each tube 80 is designed for two-stage internal fluidization and with extended external surface to increase heat transfer from the gas turbine exhaust.

Feed slurry is introduced through a distribution manifold 82 designed to provide equal flow to each tube 80. Feed slurry is introduced to each tube 80 through an orifice 84 and a conical transition 86, designed to provide a spouted bed 90 of liquid and recirculating solids in the lower portion of the tube. It is within this spouted bed that nucleation for agglomeration of tar and precipitated salts may occur. The solids provide a surface for the tar to deposit, thus providing an alternate surface of deposit for these materials rather than onto the tube walls.

A mesh screen 88 is located at the top of the spouted recirculating bed 90 to separate it from an entrained bed 92 located in the upper portion of each tube. Wire mesh screen 88 also minimizes slugging in the entrained bed 92.

As the slurry is heated from the temperature at which pyrolysis begins to reach a supercritical temperature, deposition of tars on the tube walls is minimized by the scouring action of the recirculating solids. Tars deposit on the solids until supercritical temperature is reached. Above supercritical temperature, inorganic salts that were dissolved in the feed slurry deposit on the solids to form aggregate solids. Optionally, a binder can be added to the feed stream to facilitate deposition on the solids. Deposition on the tube walls is minimized above supercritical temperature by the scouring action of the entrained solids.

The tubes terminate in a head space 96 at the top of the tubes where the particles are separated out. Additional residence time for dissolving and reforming organics in the hot vapor is provided in the head space. Solids are carried by the vapor into a mechanical cleaning system 98 which is designed to separate the solids for removal via a nozzle 99 to an ash preparation system. Mechanical cleaning system 98 is preferably a centrifugal separator. Optionally, the aggregate solids may be returned for recirculation, or removal through a drain 100. The separated hot vapor is removed through a nozzle 101 to an expander turbine where the vapor is expanded for the production of useful work. In the embodiment of FIG. 3, the expander turbine can be seen as first turbine 48.

The present invention provides an apparatus and method for oxidizing organic material without addition of excess high pressure oxygen. The organic material is mixed with water and pressurized to a high pressure. The mixture is then heated to a temperature which vaporizes at least a portion of the mixture. The vapor is recovered for use as a fuel and for useful work. Solids introduced into the reactor tube scrub the walls of the reactor tube so as to prevent fouling and corrosion of the reactor. This action is referred to as fluidized bed particle scrubbing.

The apparatus of the present invention is comprised of a conduit system for connecting a slurry system to a slurry pump such that organic materials and slurry can be mixed, and a slurry pump for increasing the pressure of the mixture. In communication therewith is a heat exchanger configured so as to provide heat to the organic material and slurry mixture thereby causing at least a portion of the mixture to be vaporized so as to form solids and vapor. Solids are used within the heat exchanger to scrub the walls of the heat exchanger in order to prevent failing and corrosion. A first separator is in communication with the heat exchanger for separating the solids from the vapor. At a cooler, the solids are cooled by added wastewater. A lockhopper is used for reducing the pressure of the solids.

In communication with the separator is a first turbine through which the vapor passes after passing through the separator. The first turbine is used for isentropically expanding the vapor for the production of useful work. A combuster is used for burning the vapor and thereby forming a hot flue gas. A second turbine is then used for further isentropic expansion for the production of additional useful work.

The apparatus for waste treatment of the present invention also comprises an interconnecting conduit system configured so as to interconnect the slurry system, the slurry pump, the heat exchanger, the first separator, the cooler, the lockhopper, the first turbine, the combustor, and the second turbine, so that vapors, liquids and solids may pass from one to the other.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A method for waste treatment comprising the steps of:
    a. forming a mixture of organic material, wastewater, lime and fuel;
    b. bringing the mixture to a high pressure;
    c. heating the mixture in a boiler so as to vaporize a portion of the mixture, thereby leaving solids and vapor;
    d. utilizing the solids in the mixture to form a fluidized bed particle scrubber within the boiler so as to prevent corrosive deposits and fouling; and
    e. producing net energy output from at least a portion of the vapor produced in the boiler.

2. A method for waste treatment as defined in claim 1, wherein the step of heating the mixture in the boiler comprises heating the mixture to about 1,200° F.

3. A method of waste treatment as defined in claim 1, wherein producing heat energy output from at least a portion of the vapor produced in the boiler comprises:
    a. conducting the vapor and solids to a first separator and therein separating the solids and the vapor formed in the boiler;

b. conducting the vapor to a first turbine for isentropic expansion of this vapor for the production of useful work;

c. introducing the vapor to a combustor wherein the vapor is burned with air, thereby forming a hot flue gas;

d. conducting the vapor to a second turbine for further isentropic expansion for the production of additional useful work; and e. introducing the hot flue gas back into the boiler for heating of the organic material and slurry mixture passing through the boiler, thus enhancing heat transfer.

4. A method of waste treatment as defined in claim 1, wherein the mixture is brought to a pressure in the range of about 70 psig to about 5,000 psig.

5. A method of waste treatment as defined in claim 1, wherein the mixture is brought to a pressure above about 3,207 psia.

6. A method of waste treatment as defined in claim 1, wherein solids are added with the organic material and slurry mixture to the boiler for use in the fluidized bed particle scrubber process in order to minimize fouling.

7. A method of waste treatment as defined in claim 6, wherein the added solids comprise solid steel shot.

8. A method as defined in claim 7, wherein the size of the solid steel shot is approximately 1/16 inch.

9. A method as defined in claim 1, further comprising the step of separating a clean stream of water from the vapor for use as a byproduct.

10. A method of waste treatment as defined in claim 3, wherein the first separator comprises a gravity settling separator.

11. A method of waste treatment as defined in claim 3, wherein the first separator comprises a screen-type filter.

12. A method of waste treatment as defined in claim 3, wherein the first separator comprises a centrifugal separator.

13. A method of waste treatment as defined in claim 3, wherein the combustor comprises a catalytic combustor.

14. A method of waste treatment as defined in claim 3, wherein the combustor comprises a fluidized bed combustor.

15. A method of waste treatment as defined in claim 3, further comprising the step of introducing the vapor to a second separator for further cleaning of the vapor before the step of introducing the vapor to a combustor.

16. A method of waste treatment as defined in claim 15, wherein further cleaning of the vapor comprises withdrawal of useful byproducts from the vapor and cleaning of any residual solids from the vapor.

17. A method of waste treatment as defined in claim 1, wherein the step of utilizing the solids in the mixture to form a fluidized bed particle scrubber comprises allowing the solids to scrub the walls of the boiler through a turbulent flow of the solids within the boiler.

18. A method for waste treatment comprising the steps of:

forming a mixture of organic material and feed slurry;

bringing the mixture to a high pressure;

heating the mixture in a boiler so as to vaporize a portion of the mixture, thereby leaving solids and vapor;

utilizing the solids in the mixture to form a fluidized bed particle scrubber within the boiler so as to prevent corrosive deposits and fouling; and producing net energy output from at least a portion of the vapor produced in the boiler.

19. A method for waste treatment as defined in claim 18, wherein the feed slurry comprises wastewater, lime and fuel.

20. A method for waste treatment as defined in claim 18, wherein the step of heating the mixture in the boiler comprises heating the mixture to about 1,200° F.

21. A method of waste treatment as defined in claim 18, wherein producing heat energy output from at least a portion of the vapor produced in the boiler comprises:

conducting the vapor and solids to a first separator and therein separating the solids and the vapor formed in the boiler;

conducting the vapor to a first turbine for isentropic expansion of the vapor for the production of useful work;

introducing the vapor to a combustor wherein the vapor is burned with air, thereby forming a hot flue gas;

conducting the vapor to a second turbine for further isentropic expansion for the production of additional useful work; and introducing the hot flue gas back into the boiler for heating of the organic material and slurry mixture passing through the boiler, thus enhancing heat transfer.

22. A method of waste treatment as defined in claim 18, wherein the mixture is brought to a pressure in the range of about 70 psig to about 5,000 psig.

23. A method of waste treatment as defined in claim 18, wherein the mixture is brought to a pressure above about 3,207 psia.

24. A method of waste treatment as defined in claim 18, wherein solids are added with the organic material and slurry mixture to the boiler for use in the fluidized bed particle scrubber process in order to minimize fouling.

25. A method of waste treatment as defined in claim 24, wherein the added solids comprise solid steel shot.

26. A method as defined in claim 25, wherein the size of the solid steel shot is approximately 1/16 inch.

27. A method as defined in claim 18, further comprising the step of separating a clean stream of water from the vapor for use as a byproduct.

28. A method for waste treatment comprising the steps:

forming a mixture of organic material and feed slurry;

increasing the pressure of the mixture;

heating the mixture in a heat exchanger so as to vaporize a portion of the mixture, thereby leaving solids and vapor;

utilizing the solids in the mixture to form a fluidized bed particle scrubber within the heat exchanger so as to prevent corrosive deposits and fouling;

separating the solids from the vapor and cooling the solids;

reducing the pressure of the solids for disposal;

cleaning the vapor by introducing the vapor to a separator wherein the vapor is cleaned of residual solids and useful byproducts are withdrawn;

introducing the cleaned vapor to a combustor wherein it is burned with air to form a hot flue gas;

expanding the hot flue gas for the production of work;

conducting the flue gas back to the heat exchanger to heat the mixture of organic material and feed slurry flowing therethrough; and conducting the flue gas to atmosphere.

29. A method for waste treatment as defined in claim 28, further comprising expanding the vapor for the production of useful work, before the step of introducing the cleaned vapor to a combustor, whereby the pressure and temperature of the vapor are lowered.

30. A method as recited in claim 28, wherein the feed slurry comprises wastewater, lime and fuel.

31. A method as recited in claim 28, wherein the step of introducing the cleaned vapor to a combustor further comprises superheating the cleaned vapor to a temperature from about 706° F. to about 1,200° F.

32. A method as recited in claim 28, wherein the step of heating the mixture comprises heating the mixture to a temperature of about 1,200° F.

* * * * *

UNITED STATES PATENT AND TRADEMARK OFFICE
CERTIFICATE OF CORRECTION

PATENT NO. : 5,339,621
DATED : August 23, 1994
INVENTOR(S) : RADON TOLMAN

It is certified that error appears in the above-indentified patent and that said Letters Patent is hereby corrected as shown below:

Column 5, line 57, before chart, insert —EXAMPLE 1—
Column 6, line 14, before chart, insert —EXAMPLE 2—
Column 6, line 25, "1,220" should be —1,200—

Signed and Sealed this

Fourteenth Day of March, 1995

Attest:

BRUCE LEHMAN

Attesting Officer         Commissioner of Patents and Trademarks